United States Patent
Takemura et al.

Patent Number: 5,531,133
Date of Patent: Jul. 2, 1996

[54] SHIFT LEVER ASSEMBLY FOR TRANSMISSION HAVING TURNING INHIBITING MEMBERS

[75] Inventors: Tadashi Takemura; Toshihiko Morita; Kenichi Aimi, all of Kyoto; Katsuhiro Komori, Uji, all of Japan

[73] Assignees: Mitsubishi Jidosha Kogyo Kabushiki Kaisha; Mitsubishi Jidosha Engineering Kabushiki Kaisha, both of Tokyo, Japan

[21] Appl. No.: 274,199

[22] Filed: Jul. 12, 1994

[30] Foreign Application Priority Data

Jul. 16, 1993 [JP] Japan ................................ 5-176580

[51] Int. Cl.⁶ .................................................. B60K 20/02
[52] U.S. Cl. ........................................................ 74/473 R
[58] Field of Search .................................. 74/473 R, 476

[56] References Cited

U.S. PATENT DOCUMENTS

| | | | |
|---|---|---|---|
| 2,538,653 | 7/1949 | Perkins | 74/473 R |
| 2,680,657 | 6/1954 | Drozynski | 74/473 R |
| 2,906,139 | 9/1959 | Ferchl et al. | 74/473 |
| 2,951,392 | 9/1960 | Backus | 74/473 |
| 3,382,732 | 5/1968 | Oram et al. | 74/473 |
| 3,495,473 | 2/1970 | Willis | 74/473 R |
| 4,104,929 | 8/1978 | Kessmar | 74/473 R |
| 4,532,823 | 8/1985 | Razzacki | 74/473 R |
| 4,784,009 | 11/1988 | Sakamoto et al. | 74/473 R |
| 4,827,793 | 5/1989 | Loeffler | 74/473 R |
| 4,852,421 | 8/1989 | Kerboul | 74/473 R |
| 5,036,722 | 8/1991 | Park | 74/476 |
| 5,085,095 | 2/1992 | Lasoen | 74/473 R |

FOREIGN PATENT DOCUMENTS 62-110073  5/1987  Japan ................................ 74/476

Primary Examiner—Richard M. Lorence
Assistant Examiner—David Fenstermacher
Attorney, Agent, or Firm—Evenson, McKeown, Edwards & Lenahan

[57] ABSTRACT

Outermost fork shafts are provided adjacent to shift lugs thereof with arms which have free end faces opposing each other. The arms prevent the shift lugs from moving apart from their adjacent shift lug, thereby making it possible to prevent a control finger from accidentally entering between adjacent shift lugs.

11 Claims, 8 Drawing Sheets

SHIFT LEVER ASSEMBLY FOR TRANSMISSION HAVING TURNING INHIBITING MEMBERS

BACKGROUND OF THE INVENTION a) Field of the Invention

This invention relates to a shift lever assembly for a transmission, which shift lever assembly has realized precise engagement between a control finger and shift lugs in a gear position selector mechanism.

b) Description of the Related Art

Manually shifted automobile transmissions are provided with a shift lever assembly. Shift lever assemblies have conventionally included those provided with two fork shafts (shift rails) and those equipped with three fork shafts.

A shift lever assembly with two fork shafts is arranged, for example, as an indirectly operated shift lever assembly with a shift lever disposed on a column portion of a steering wheel and is employed in association with a 3-forward/1-reverse transmission in which the first fork shaft is for the 1st range and the reverse range and the second fork shaft is for the 2nd and 3rd ranges.

A shift lever assembly with three fork shafts, on the other hand, is arranged as a directly operated shift lever assembly with a shift lever arranged on a floor and is employed in association with a 4-forward/ 1-reverse transmission in which the first fork shaft is for the 1st and 2nd ranges, the second fork shaft is for the 3rd and 4th ranges, and the third fork shaft is for the reverse range or as a 5-forward/1reverse in which the third fork shaft is for the fifth range and the reverse range.

Whichever the shift lever assembly may be, individual fork shafts are provided at predetermined positions with shift forks (gear shift forks), respectively, and also at basal end portions (at one end portions) thereof with shift lugs in an adjacent relationship. A control finger disposed at a free end portion of a shift lever is brought into engagement with one of the shift lugs to select the fork shaft to be slidingly shifted.

FIG. 11 illustrates one example of a conventional shift lever assembly equipped with three fork shafts. Three shifting fork shafts 1,2,3 are arranged in parallel with each other and at one end portion of the respective fork shafts 1,2,3 shift lugs 4,5,6 are arranged adjacent each other.

The individual shift lugs 4,5,6 are provided with pockets 4a, 5a, 6a, respectively, so that the pockets 4a, 5a, 6a are communicated with each other. In the pockets 4a, 5a, 6a so communicating, a free end portion of a control finger 7 is fitted.

Further, the fork shafts 1,2,3 are provided with shift forks 9,10, respectively (note: the third shift fork is not shown).

Because of such a construction, operation of a shift lever 8 causes the control finger 7 to move in the pockets (4a, 5a, 6a) so that the control finger 7 is selectively brought into engagement with one of the shift lugs 4,5,6. The thus-selected one of the fork shafts 1,2,3 is axially moved forward or rearward (shifted), whereby sliding gears and counter gears of the transmission are selectively connected together or a shift sleeve of a synchromesh gear mechanism is caused to slide to achieve a desired gear position.

Although not clearly envisaged from FIG. 11, the shift lugs 4,5,6 and the control finger 7 are chamfered at mutually-contacting corner portions as shown in FIGS. 5 and 9 to improve the shift feeling of the control finger 7.

The above conventional shift lever assembly is however accompanied by the problem that when the control finger 7 is shifted at a position between two adjacent shift lugs to perform a gear shift, the control finger 7 may enter between the shift lugs to produce wedging force and this wedging force then acts to bend components and to widen the distance between the shift lugs beyond a tolerance, whereby the control finger 7 is fitted in between the shift lugs, for example between shift lugs 5,6 (or 4,6) as shown in FIGS. 6 and 10 and shifting operation becomes no longer feasible.

The above problem occurs especially because wedging forces as a result of an attempted entry of the control finger 7 between the shift lugs 5,6 (or 4,6) act on the shift forks 9,10 via the fork shafts 2,3 (or 2,1), causing the shift forks to flex. The fork shafts are then forced to turn to the extent corresponding to the flexions of the shift forks, respectively, and the shift lugs are consequently forced to turn.

This problem occurs more markedly as the lengths of the shift forks become longer, for example because of the adoption of a larger transmission.

SUMMARY OF THE INVENTION

With the foregoing in view, the present invention has as a primary object thereof the provision of a shift lever assembly for a transmission, said assembly having plural fork shafts arranged in parallel with each other, shift lugs fixed in a mutually adjacent relationship on the fork shafts, respectively, and a control finger associated with a shift lever and releasably engageable with the shift lugs, whereby the control finger is selectively brought into engagement with one of the shift lugs to cause the corresponding one of the fork shafts to slide, thereby performing a shifting operation, characterized in that the shift lugs arranged on outermost sides out of the mutually-adjacent plural shift lugs or the fork shafts on which the outermost shift lugs are fixed, respectively, are provided with members for inhibiting turning of the shift lugs. If the control finger begins to enter between the shift lugs, the shift lugs begin to turn in such directions that the distance between them would become wider. By the turning inhibiting members, however, the shift lugs are inhibited from turning so that the distance between the shift lugs is prevented from becoming wider.

Preferably, the turning inhibiting members can comprise turning inhibiting arms fixed on the shift lugs arranged on the outermost sides or on the fork shafts on which the outermost shift lugs are fixed, respectively; and the turning inhibiting arms can be arranged so that basal portions of the turning inhibiting arms can be fixed on the outermost shift lugs or on the fork shafts on which the outermost shift lugs are fixed, respectively, and free end faces of the turning inhibiting arms can be brought into contact with each other when the outer most shift lugs are caused to turn. If the control finger begins to enter between the shift lugs, the shift lugs begin to turn in such directions that the distance between them would become wider. However the free end faces of the turning inhibiting arms are immediately brought into contact with each other. The shift lugs are hence inhibited from turning so that the distance between the shift lugs is prevented from becoming wider. It is therefore possible to avoid such a situation that shifting operation would become no longer feasible.

The free end faces of the turning inhibiting arms can preferably be disposed at positions spaced apart from a plane which contains both central axes of the fork shafts arranged on the outermost sides, respectively. When the free end faces of the turning inhibiting arms are brought into contact with each other, moments are produced on the shift lugs or the corresponding fork shafts. As a consequence, the control finger begins to enter between the shift lugs, and the shift lugs begin to turn in such directions that the distance between them would become wider. The free end faces of the turning inhibiting arms are however brought into contact with each other, thereby making it possible to inhibit any further turning of the shift lugs and hence to prevent the distance between the shift lugs from becoming wider. It is therefore possible to avoid such a situation that shifting operation would become no longer feasible. Shifting operation can therefore be performed more surely.

The free end faces of the turning inhibiting arms can desirably be disposed on a side opposite to control-finger-engaged portions of the shift lugs relative to a plane which contains both central axes of the fork shafts arranged on the outermost sides, respectively. If the control finger begins to enter between the shift lugs and the shift lugs begin to turn in such directions that the distance between them would become wider, the free end faces of the turning inhibiting arms are however brought into contact with each other, thereby making it possible to surely inhibit any further turning of the shift lugs and hence to prevent the distance between the shift lugs from becoming wider. It is therefore possible to avoid such a situation that shifting operation would become no longer feasible. Shifting operation can therefore be performed more surely.

The turning inhibiting arms can be tapered desirably. Even if it is attempted to force the control finger to enter between the shift lugs subsequent to the contact between the free end faces of the turning inhibiting arms, the basal end portions of the turning inhibiting arms have a greater cross-sectional area than the free end faces thereof. The turning inhibiting arms are therefore preventing from being broken at the basal end portions thereof, resulting in an increase in the overall strength of the arms.

It is preferred that the shift lugs define recesses with which the control finger is engageable, the recesses are in communication with each other so that a free end portion of the control finger is reciprocally movable in a direction perpendicular to axes of the fork shafts, and each control-finger-contacting wall of each of the recesses is chamfered at each control-finger-contacting corner portion thereof to provide good shift feeling. Although such chamfered corner portions tend to facilitate entrance of the control finger between the shift lugs, the provision of the turning inhibiting members can achieve both to improve the shift feeling and to prevent the control finger from entering between the shift lugs.

DETAILED DESCRIPTION OF THE INVENTION AND PREFERRED EMBODIMENTS

Figure 1:
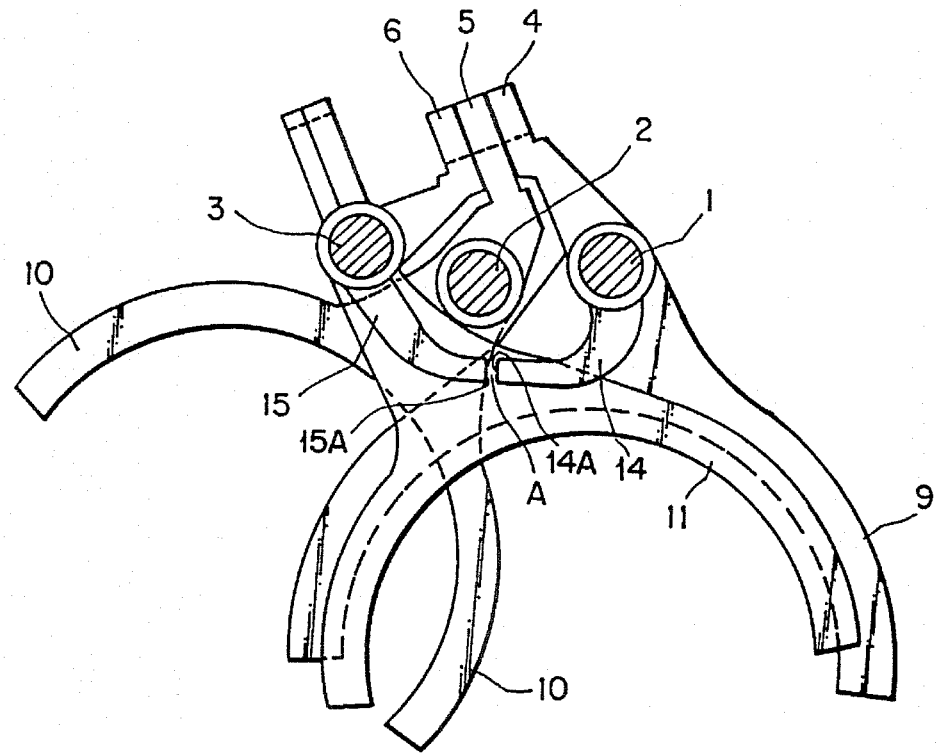
FIG. 1 is a fragmentary side view of a shift lever assembly according to a first embodiment of the present invention, which is suited for use with a transmission and is equipped with three fork shafts.
Figure 2:
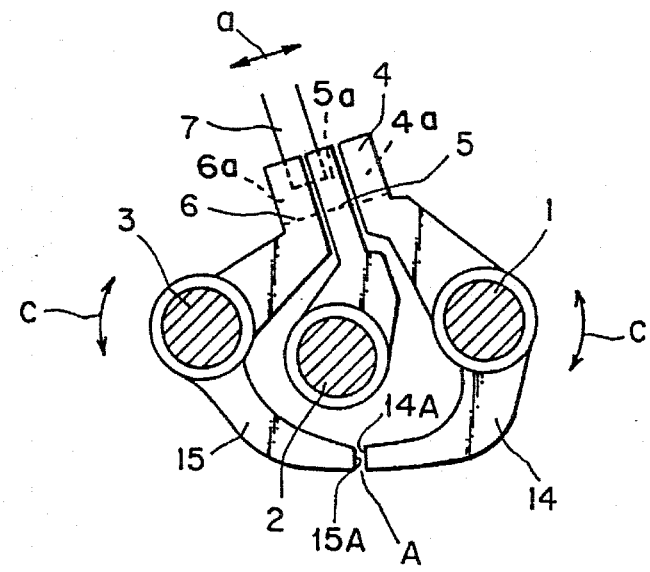
FIG. 2 is similar to FIG. 1 but shows only essential parts.

A description will first be made of the shift lever assembly according to the first embodiment of this invention, which is equipped with three fork shaft. Referring to FIGS. 1 and 2, there are shown a 1st/2nd range fork shaft 1 as a first fork shaft, a 5th/reverse range fork shaft 3 as a second fork shaft, and a 3rd/4th fork shaft 2 positioned as a third fork shaft between the fork shafts 1 and 2. The fork shafts 1,2,3 are provided at one end portion thereof with a first shift lug 4, a third shift lug 5 and a second shift lug 6, respectively.

On a side of opposite ends thereof, the fork shafts 1,2,3 are also provided at different positions with shift forks 9,10,11, respectively.

Figure 3:
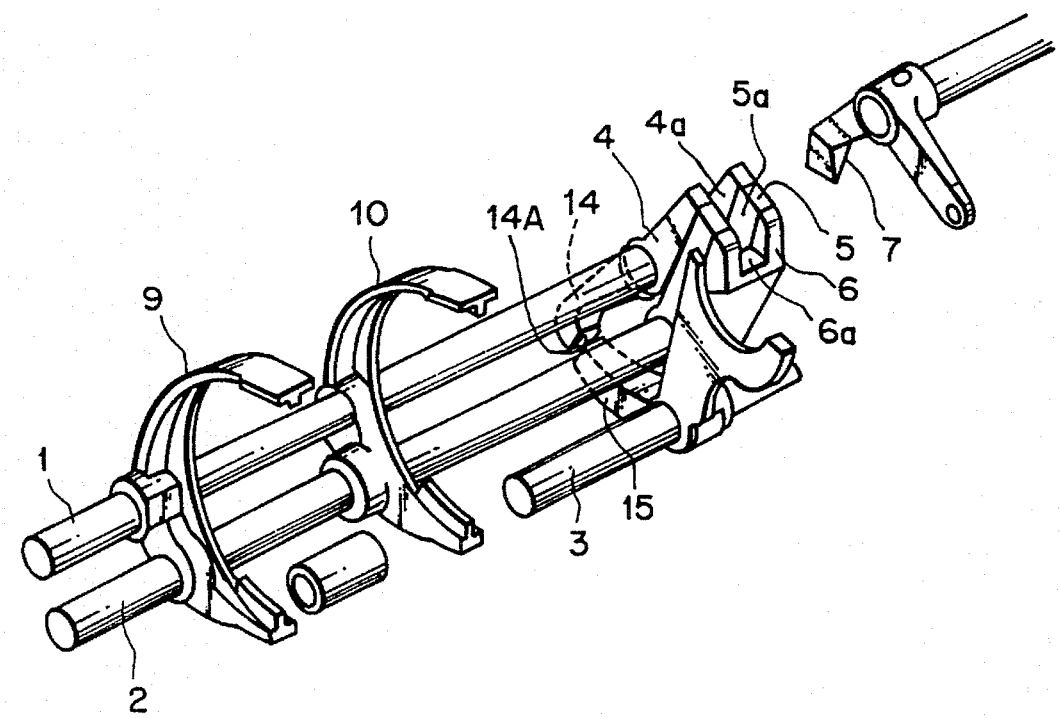
FIG. 3 is a fragmentary perspective view of the shift lever assembly according to the first embodiment.

The shift lugs 4,5,6 define pockets 4a, 5a, 6a, which are communicated with each other (see FIG. 3) so that a free end portion of a control finger 7 is reciprocally movable in the directions a as viewed in FIG. 2.

Figure 4:
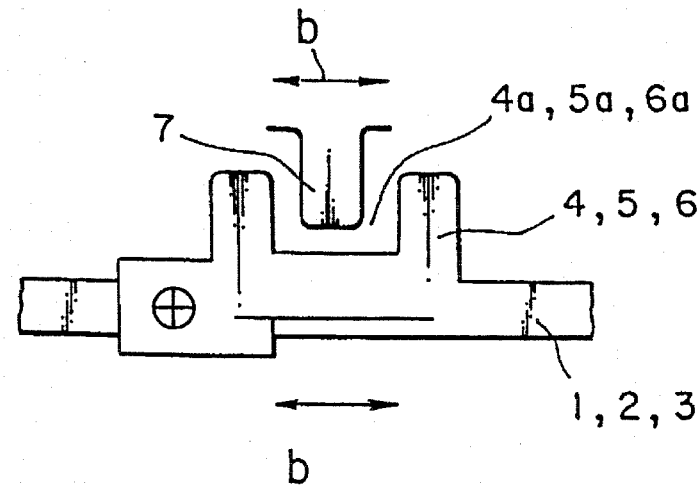
FIG. 4 is a schematic front view showing shift lugs and an engaging portion of a control finger in the shift lever assembly according to the first embodiment.
Figure 11:
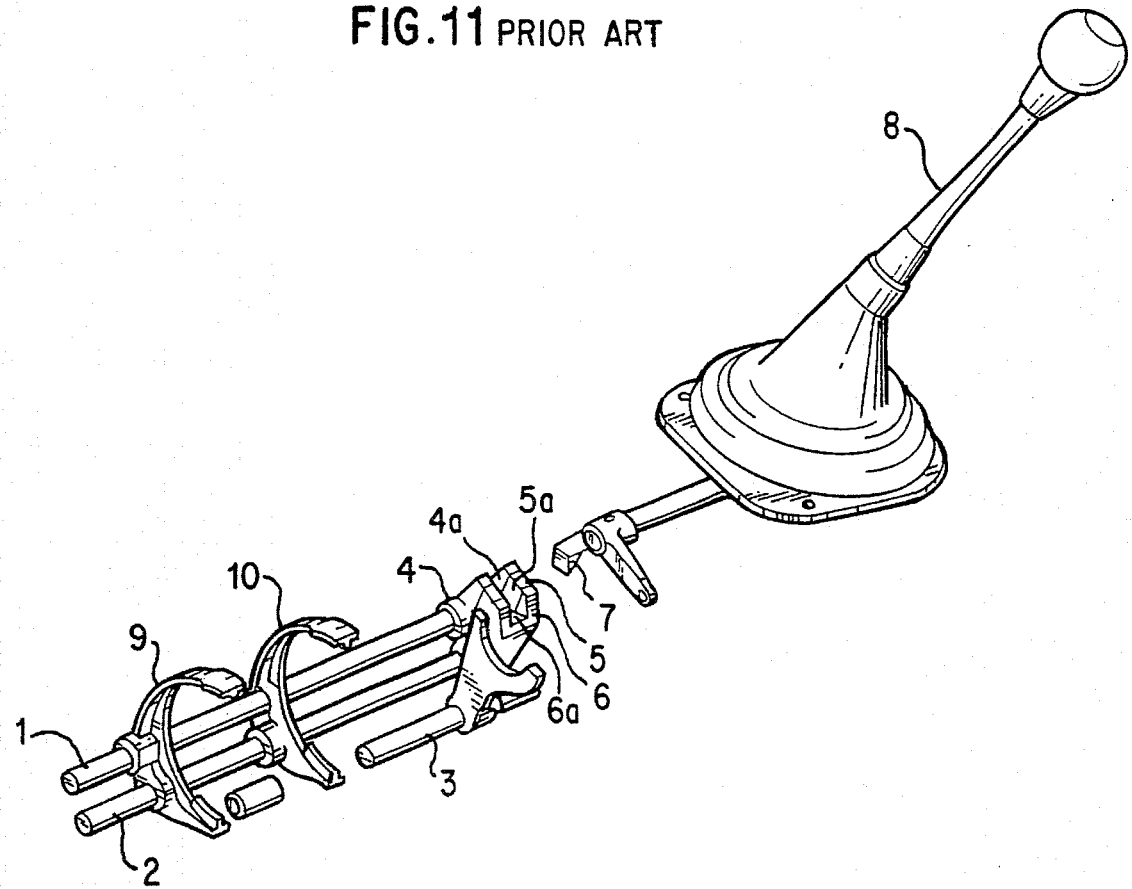
FIG. 11 is a perspective view of a conventional shift lever assembly for a transmission, which is suited for use with a transmission and is equipped with three fork shafts.

Accordingly, selective engagement with one of the first, third and second shift lugs 4,5,6 can be effected by manipulating the control finger 7 via a shift lever 8 (see FIG. 11). The fork shaft 1, 2 or 3 so selected is then moved (shifted) forward or rearward as indicated by arrow b in FIG. 4 to set a desired gear position.

On ends of the outer most shift lugs, first and second shift lugs 4,6, tapered arms 14,15 symmetrically extend in a curved configuration generally opposite the shift lugs with respect to the fork shafts; to prevent the first and second shift lugs 4,6 from moving away from the inner shift lug, third shift lug 5. The first and second shift lugs 4,6 extend out from basal portions of the first and second shift lugs 4,6, respectively, and free end faces 14A,15A formed at their free end portions are positioned opposite to each other relative to turning directions (arrows c in FIG. 2) of the fork shafts 1,3. These free end faces 14A,15A are disposed on a side opposite to control-finger-engaged portions of the shift lugs 4,6 relative to a plane which contains both central axis of said fork shafts 1,3.

Figure 5:
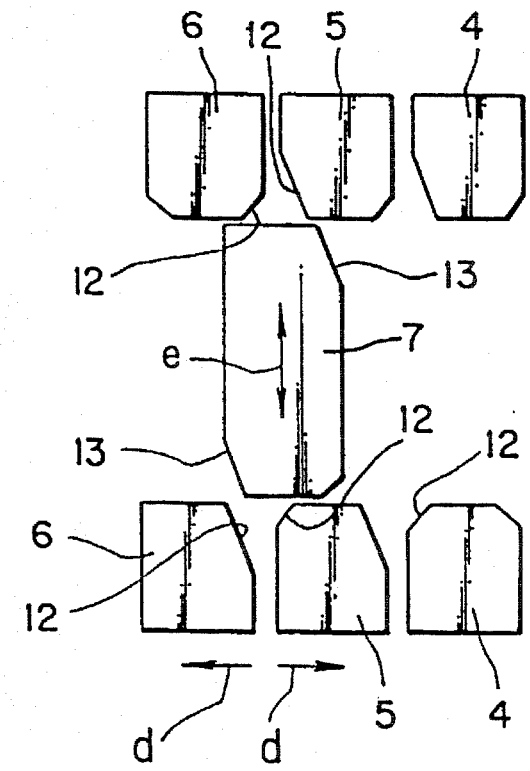
FIG. 5 is a schematic top plan view illustrating the manner of operation of the control finger in the first embodiment shown in FIG. 1.

If the shift lugs 4,6 or the fork shafts 1,3 begin to turn even slightly in a predetermined direction (i.e., in the direction that control-fin-engaging portions of the adjacent shift lugs become apart from each other), the free end faces 14A,15A of the arms 14,15 are brought into contact with each other to immediately stop turning of the shift lugs 4,6 or the fork shafts 1,3 so that the shift lug 6 or 4 is prevented from moving away from the shift lug 5 (as indicated by arrows d in FIG. 5).

Figure 7:
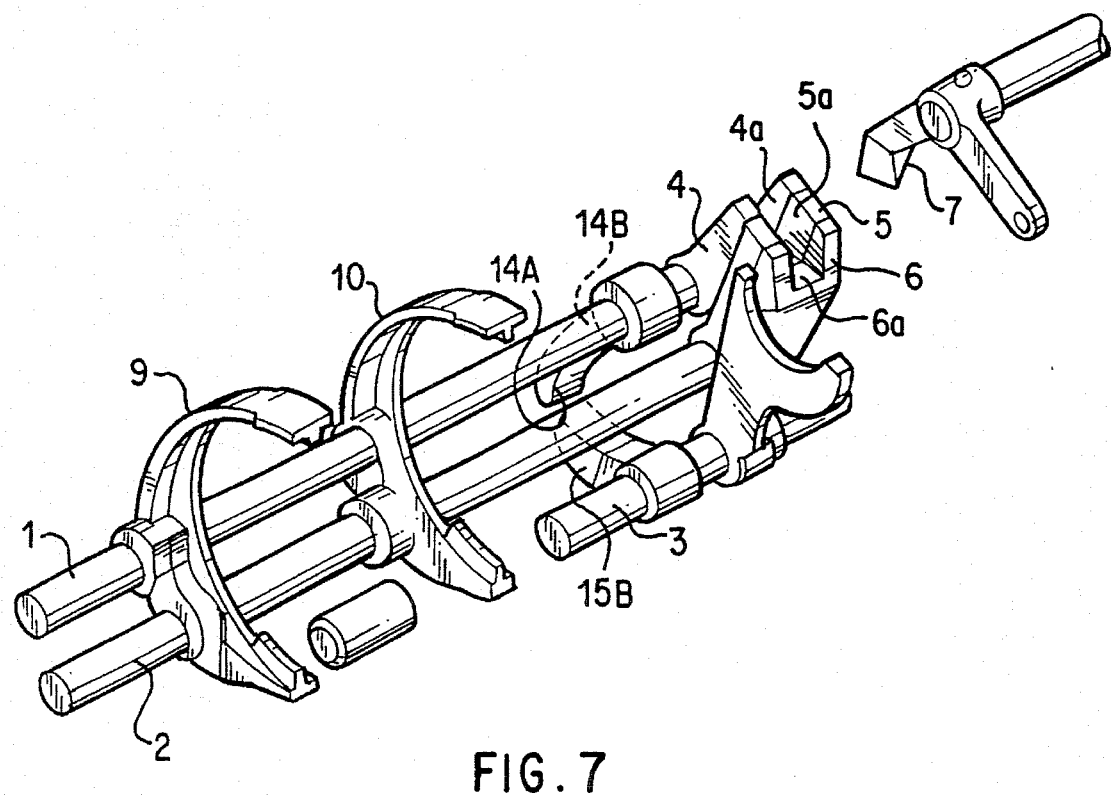
FIG. 7 is a fragmentary perspective view of a modification of the first embodiment of this invention.

In the illustrated embodiment, the arms 14,15 are provided so that the basal portions of the shift lugs 4,6 extend to an opposite side of the fork shafts. These arms 14B,15B can also be provided on the side of fork shafts 1,3 as shown in FIG. 7. In this case, it is desired to arrange the arms 14B,15B at positions near the shift lugs 4,6 of the fork shafts 1,3.

Figure 6:
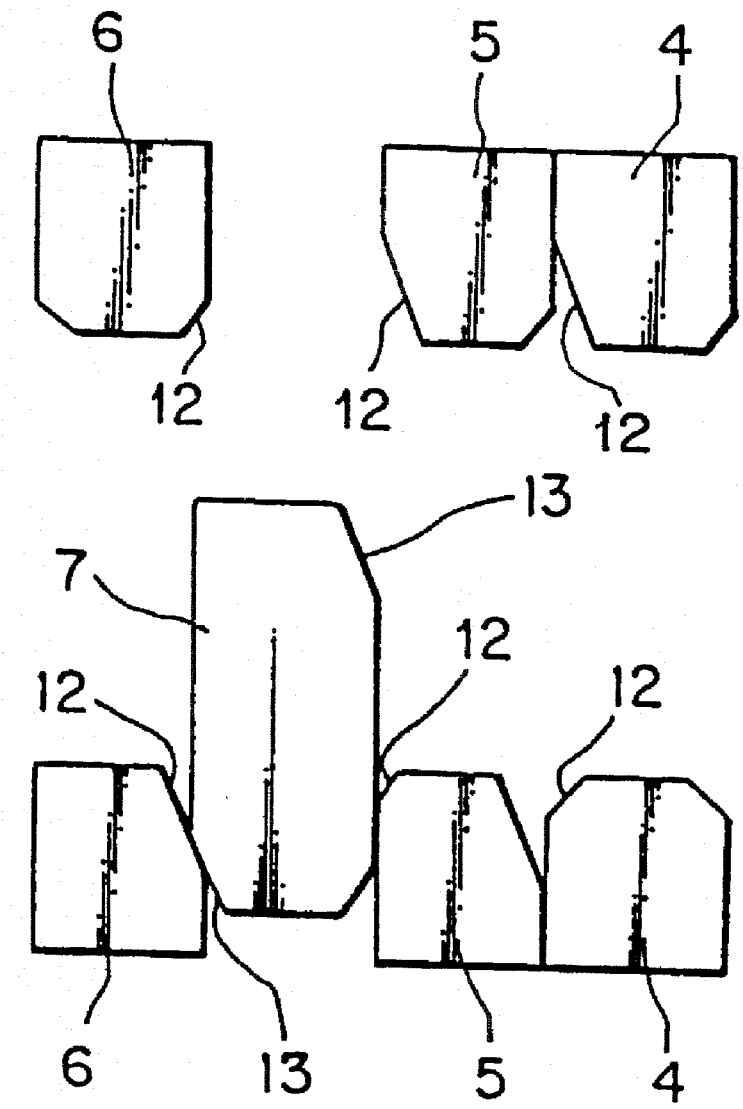
FIG. 6 is a schematic top plan view depicting the manner of false operation of the control finger in FIG.

As already mentioned above, mutually-contacting corner portions of the shift lugs 4,5,6 and the control finger 7 have chamfers 12,13 to improve the shift feeling of the control finger 7. When the control finger 7 is shifted (in the direction of arrow e), for example, at a position between the shift lugs 5 and 6, this shifting has heretofore involved the potential problem that as shown in FIG. 6, the control finger 7 may enter between the shift lugs 5 and 6 and shifting operation may become no longer feasible.

Owing to the above-described construction, the present invention has overcome the above potential problem. When one attempts+to shift the control finger 7 at a position between the shift lugs 5 and 6 (or 5 and 4), the free end faces 14A,15A of the arms 14,15 are brought into contact with each other so that the fork shafts 1,3 cannot turn any further. The distance between the shift lugs 5 and 6 (or 5 and 4) is therefore not widened beyond a tolerance so that unlike the problem shown in FIG. 6, the control finger 7 is prevented from entering between the shift lugs 5 and 6 (or 5 and 4).

Accordingly, the control finger 7 does not produce wedging force as a result of its entrance between the shift lugs 5 and 6 (or 5 and 4), thereby bringing about the advantageous effects that components will not be bent and the shift lever will not become inoperative.

The turning inhibiting arms 14,15 can be tapered desirably. Even if it is attempted to force the control finger 7 to enter between the shift lugs 4,6 subsequent to the contact between the free end faces 14A,15A of the turning inhibiting arms 14,15, the basal end portions of the turning inhibiting arms 14,15 have a greater cross-sectional area than the free end faces 14A,15A thereof. The turning inhibiting arms 14,15 are therefore preventing from being broken at the basal end portions thereof, resulting in an increase in the overall strength of the arms.

Figure 8:
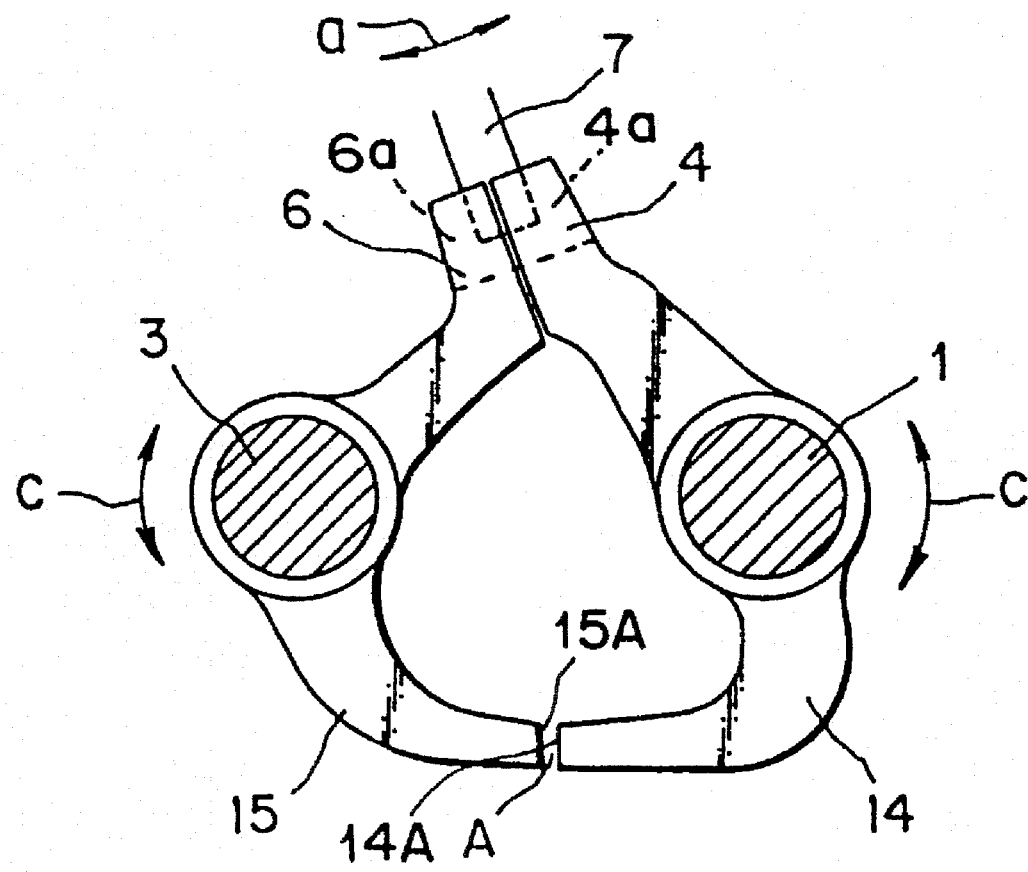
FIG. 8 is a fragmentary side view of a shift lever assembly according to a second embodiment of the present invention, which is suited for use with a transmission and is equipped with two fork shafts.

A description will next be made of the shift lever assembly according to the second embodiment of the present invention, which is equipped with two fork shafts. As is illustrated in FIG. 8, there are arranged a 1st/reverse range fork shaft 1 as a first fork shaft and a 2nd/3rd fork shaft 3 as a second fork shaft. On the first and second fork shafts 1,3, a first shift lug 4 and a second shift lug 6 are disposed in a mutually-adjacent manner.

Figure 9:
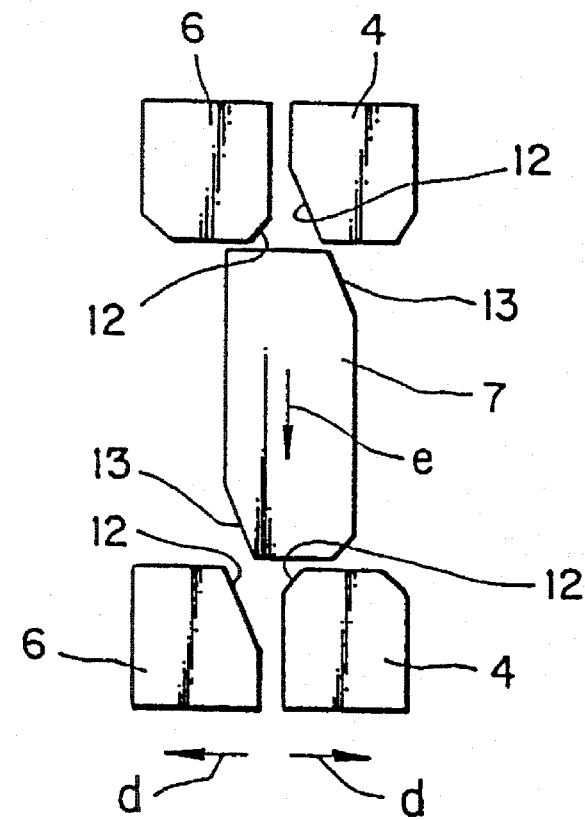
FIG. 9 is a schematic top plan view illustrating the manner of operation of the control finger in FIG. 8.

The second embodiment is similar to the first embodiment in that the control finger 7 is engageable with pockets 4a, 6a of the shift lugs 4,6 and the shift lugs 4,6 and the control finger 7 have chamfers 12,13 at corner portions thereof. Detailed description of these similar structural features is therefore omitted herein. Further, arrows a, c, d and e in FIGS. 8 and 9 have the same meanings as in the first embodiment.

Figure 10:
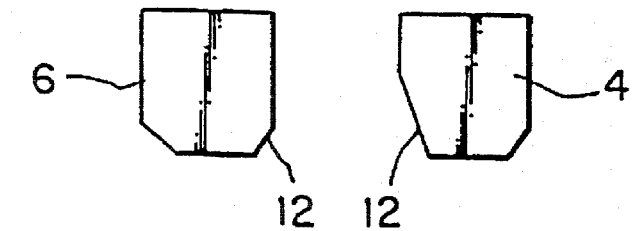
FIG. 10 is a schematic top plan view depicting the manner of false operation of the control finger in FIG. 8.
Figure 10:
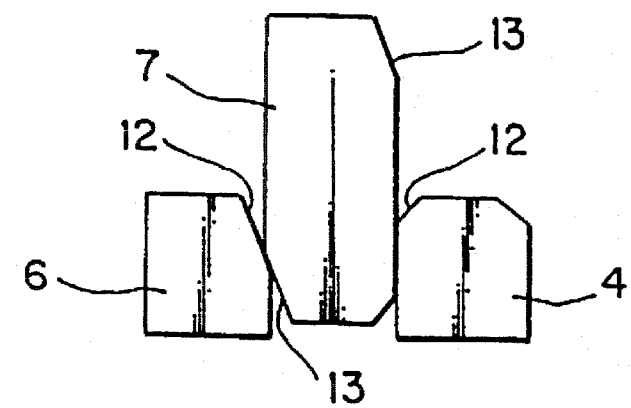

Even if one attempts to shift the control finger 7 at a position between the shift lugs 4 and 6 in the second embodiment, the control finger 7 is prevented from accidentally entering between the shift lugs 4 and 6 by the contact of free end faces 14A,15A of turning inhibiting arms 14,15, unlike the problem illustrated in FIG. 10. As a consequence, shifting operation will be performed accurately without failure and will not damage components.

What is claimed is:

1. A shift lever assembly for a transmission, said assembly comprising a plurality of fork shafts arranged in parallel with each other shift lugs fixed in a mutually adjacent relationship on said fork shafts, respectively; a control finger associated with a shift lever and releasably engageable with said shift lugs to cause a corresponding one of said fork shafts to slide to perform a shifting operation; and turning inhibiting members arranged on outermost shift lugs located on outermost sides of said mutually-adjacent shift lugs.

2. A shift lever assembly according to claim 1, wherein said shift lugs define recesses with which said control finger is engageable, said recesses are in communication with each other so that a free end portion of said control finger is reciprocally movable in a direction perpendicular to axes of said fork shafts, and each control-finger-contacting wall of each of said recesses is chamfered at each control-finger-contacting corner portion thereof.

3. A shift lever assembly according to claim 1, wherein said turning inhibiting members comprise turning inhibiting arms fixed on said outermost shift lugs, respectively; and said turning inhibiting arms are arranged so that basal portions of said turning inhibiting arms are fixed on said outermost shift lugs, respectively, and free end faces of said turning inhibiting arms are brought into contact with each other when said outermost shift lugs are caused to turn.

4. A shift lever assembly according to claim 3, wherein said free end faces of said turning inhibiting arms are disposed at positions spaced apart from a plane which contains both central axes of outermost fork shafts on which said outermost shift lugs are fixed, respectively.

5. A shift lever assembly according to claim 3, wherein said free end faces of said turning inhibiting arms are disposed on a side opposite to control-finger-engaged portions of said shift lugs relative to a plane which contains both central axes of outermost fork shafts on which said outermost shift lugs are fixed, respectively.

6. A shift lever assembly according to claim 3, wherein said turning inhibiting arms are tapered.

7. A shift lever assembly for a transmission, said assembly having a plurality of fork shafts arranged in parallel with each other, shift lugs fixed in a mutually adjacent relationship on said fork shafts, respectively, and a control finger associated with a shift lever and releasably engageable with said shift lugs to cause a corresponding one of said fork shafts to slide to perform a shifting operation, wherein outermost fork shafts are said fork shafts upon which outermost of said mutually adjacent shift lugs are arranged, and wherein turning inhibiting arms are arranged on said outermost fork shafts proximate the shift lugs, said turning inhibiting arms being configured so that basal portions of said turning inhibiting arms are fixed on said outermost fork shafts, respectively, and free end faces of said turning inhibiting arms are brought into contact with each other when said outermost shift lugs are caused to turn.

8. A shift lever assembly according to claim 7, wherein said free end faces of said turning inhibiting arms are disposed at positions spaced apart from a plane which contains both central axes of said outermost fork shafts, respectively.

9. A shift lever assembly according to claim 7, wherein said free end faces of said turning inhibiting arms are disposed on a side opposite to control-finger-engaged portions of said shift lugs relative to a plane which contains both central axes of said outermost fork shafts, respectively.

10. A shift lever assembly according to claim 7, wherein said turning inhibiting arms are tapered.

11. A shift lever assembly according to claim 7, wherein said shift lugs define recesses with which said control finger is engageable, said recesses being in communication with each other such that a free end portion of said control finger is reciprocally movable in a direction perpendicular to axes of said fork shafts, and each control-finger-contacting wall of each of said recesses is chamfered at each control-finger-contacting corner portion thereof.

* * * * *